United States Patent
Yamamoto (10) Patent No.: US 6,896,100 B2
(45) Date of Patent: May 24, 2005

(54) NOISE REDUCING APPARATUS AND EXHAUST NOZZLE FOR JET ENGINE

(75) Inventor: Masahiko Yamamoto, Tokyo (JP)

(73) Assignee: Ishikawajima-Harima Heavy Industries Co., Ltd., Tokyo (JP)

(*) Notice: Subject to any disclaimer, the term of this patent is extended or adjusted under 35 U.S.C. 154(b) by 236 days.

(21) Appl. No.: 10/263,412

(22) Filed: Oct. 2, 2002

(65) Prior Publication Data

US 2004/0065502 A1 Apr. 8, 2004

(51) Int. Cl.$^7$ .................................................. F02K 1/00
(52) U.S. Cl. .................. 181/215; 181/213; 181/216; 181/219; 181/220
(58) Field of Search ........................... 181/215, 213, 181/216, 219, 220

(56) References Cited

U.S. PATENT DOCUMENTS 3,556,246 A * 1/1971 Hilbig ...................... 181/215
3,667,680 A * 6/1972 Weed ..................... 239/265.17
5,203,164 A * 4/1993 Paulson ..................... 60/226.1
5,801,341 A * 9/1998 Newell et al. .............. 181/215
5,908,159 A * 6/1999 Rudolph ................. 239/265.17

FOREIGN PATENT DOCUMENTS

JP          7247905          9/1995

* cited by examiner

Primary Examiner—Shih-Yung Hsieh
(74) Attorney, Agent, or Firm—Fish & Richardson P.C.

(57) ABSTRACT

In order to reduce noise effectively and to provide a lightweight noise reducing apparatus and an exhaust nozzle for a jet engine, a mixer for mixing an exhaust gas and an external air is disposed behind an engine, a flow channel for accelerating an exhaust gas toward a mixer and a flow channel for introducing an external air to a mixer are formed by a flow channel forming section in a noise reducing mode.

6 Claims, 7 Drawing Sheets

CRUISE MODE

FIG. 5B

NOISE REDUCTION MODE

NOISE REDUCTION MODE

FIG. 8B

SUBSONIC CRUISE MODE

FIG. 8C

SUPERSONIC CRUISE MODE

NOISE REDUCING APPARATUS AND EXHAUST NOZZLE FOR JET ENGINE

BACKGROUND OF THE INVENTION

1. Field of the Invention

The present invention relates to a noise reducing apparatus and an exhaust nozzle for a jet engine, particularly for reducing noise effectively while providing a light weight apparatus.

2. Description of Related Art

In an jet engine, it is known that a large amount of noise occurs due to a jet flow caused by an exhaust gas which is exhausted from an engine. In particular, in a jet engine for a supersonic transporter (SST), there is a large amount of noise because the velocity of jet flow is high; thus, reducing noise which is generated near the ground due to take-off, landing, and low level flight is a problem to be solved.

Figure 9:
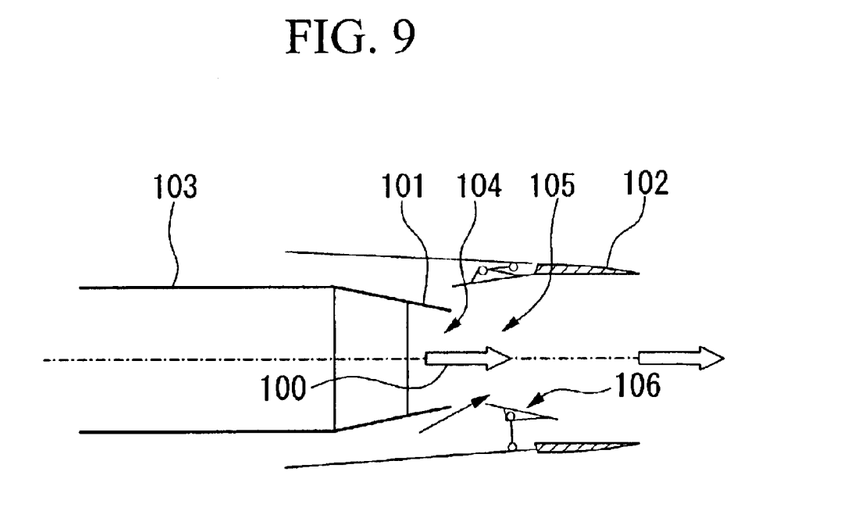
FIG. 9 is a cross section of a conventional exhaust nozzle for a jet engine.

Therefore, in a jet engine which is used for a supersonic transporter, there has been research on the provision of an exhaust nozzle, for example, as shown in FIG. 9. In FIG. 9, the upper half indicates supersonic cruising flight and the lower half indicates a noise reducing mode. The exhaust nozzle shown in FIG. 9 is provided with a first movable nozzle 101 for controlling flow of an exhaust gas 100 and a second movable nozzle 102 therebehind for mixing an external air with the exhaust gas so as to mix them. A high speed exhaust gas 100 which is exhausted from an engine 103 is accelerated so as to be an ultra-high-speed jet flow by passing a convergent flow channel 104 and a divergent flow channel 105. When noise must be reduced (i.e., during take-off, landing and low level flight), noise reduction is performed by introducing an air outside a second movable nozzle 102 into the second movable nozzle 102, and mixing a high-speed exhaust gas from a first movable nozzle 101 and a low-speed external air by a mixer 106 so as to reduce the speed of the jet flow. On the other hand, during supersonic cruising in which an airplane cruises at a very high altitude where noise is not a serious problem, the introduction of external air is stopped, and jet flow is blown out therebehind by retracting mixer 106.

However, in such an exhaust nozzle for a jet engine, the performance of the mixer is so poor that there was a problem in that noise could not be reduced sufficiently. That is, in order to avoid a deleterious influence on propulsion efficiency due to resistance of a mixer, it is necessary to retract the mixer from the supersonic flow path during cruising. Therefore, there are severe limits on the shape and size of the mixer, it was possible to employ a mixer having only unsatisfactory performance such as a plate-type mixer.

Also, in recent jet engines, there is a trend in which required functions for an exhaust nozzle is increased for the purpose of obtaining optimum propulsion efficiency; thus, research on exhaust nozzles having rectangular cross sections is under way so as to form it for each function, including a noise reducing function, in a relatively a simple structure.

However, in such an exhaust nozzle having a rectangular cross section, it is difficult to achieve high rigidity comparing to an exhaust nozzle having a circular cross section. There is a problem in that the weight of the exhaust nozzle tends to be increased to a great extent by an increased thickness of components during tests for obtaining a required rigidity.

SUMMARY OF THE INVENTION

The present invention was made in consideration of the above-mentioned problems. An object of the present invention is to provide a noise reducing apparatus and an exhaust nozzle which can reduce noise due to jet flow effectively and to realize a light-weight apparatus easily. Also, another object of the present invention is to provide an exhaust nozzle for a jet engine which can obtain an optimum propulsion efficiency. In order to solve the above-mentioned problems, an invention according to a first aspect is a noise reducing apparatus for a jet engine having a cruising mode and noise reducing mode and reduces noise due to an exhaust gas from an engine in a noise reducing mode. Here, a noise reducing apparatus for a jet engine comprises a mixer which is disposed behind an engine for mixing exhaust gas and external air, a flowing channel forming section which forms a flow channel which accelerates the exhaust gas toward the mixer in a noise reducing mode and a flow channel which introduces an external air to the mixer.

In such a noise reducing apparatus, an external air outside of a mixer is introduced into a mixer by a flow channel forming section in a noise reducing mode. By mixing an external air and an exhaust gas by a mixer, the speed of the exhaust gas is reduced, and the noise is reduced. Also, at this time, the exhaust gas is accelerated toward a mixer by a flow which is formed by a flow channel forming section, and propulsion force occurs by an accelerated flow. In this way, such a noise reducing apparatus has not only a noise reducing function but also a function for accelerating an exhaust gas so as to generate propulsion force. Therefore, it is possible to dispose a mixer in a distant position from a position in which an exhaust gas is accelerated in a cruise mode. Accordingly, it is possible to dispose a mixer in a more forward position than a position in which an exhaust gas is accelerated in a cruise mode. By doing this, the speed of an exhaust gas which flows into a mixer in a cruise mode is reduced before acceleration; thus, propulsion efficiency receives less influence due to resistance of the mixer. Therefore, it is not necessary to retract the mixer; thus a light-weight apparatus can be easily realized.

According to a second aspect of the present invention, a flow channels are formed of which cross section is circular; thus, rigidity of an entire apparatus increases.

Also, according to a third aspect of the present invention, the above-mentioned flow channel forming section may be a part of a duct which faces to an external air in cruise mode. Furthermore, the above-mentioned flow channel forming section may comprise a first movable member which is a part of a duct facing to external air in a cruising mode and introduces the external air diagonally from a duct to a mixer in a noise reducing mode, a plurality of second movable members which are disposed apart from each other in the cruising mode and which contact each other in a noise reducing mode and form a diaphragm flow channel thereinside, and an actuator which changes disposition of the first and the second movable members according to the mode.

In this case, in a cruise mode, a first movable member is disposed apart from an air flow, and second movable members form a part of a duct which faces an external air. By doing this, increase of resistance against a flow of an exhaust gas by a first and second movable members is restrained. Also, in a noise reducing mode, an exhaust gas is accelerated by a contracting movement of a first movable member for forming a diaphragm flow channel thereinside. Also, second movable members move diagonally from a duct; thus, an external air is introduced to a mixer.

According to a fourth aspect of the present invention, a first movable member and the second movable members may be connected so as to make cooperative movement. In this case, a connecting structure for first and second movable members can be simplified.

Also, according to a fifth aspect of the present invention, a noise absorbing duct may be disposed where an absorbing member is attached thereinside behind a mixer. In this case, noise of an exhaust gas which is at a low speed by being mixed with an external air can be further reduced in a noise absorption duct.

According to a sixth aspect of the present invention, a convergent-divergent exhaust nozzle for an jet engine has an actuator which changes the cross section area of a divergent flow channel according to cruising speed, and diaphragm flow channel, and a diffusing flow channel for accelerating exhaust gas from the engine are formed.

In such an exhaust nozzle, a cross section area of a diffusing flow channel varies according to cruise speed. Therefore, an exhaust gas is diffused efficiently; thus, adequate propulsion force occurs. For example, when cruising speed is high and a pressure ratio between a pressure of an exhaust gas and an air is high, a cross section area of an exit of nozzle is made large. In contrast, when cruising speed is low and the above-mentioned ratio is low, a cross section area of an exit of nozzle is made small. By doing this, an exhaust gas flows efficiently in a flow channel; thus, adequate propulsion force can be obtained.

According to a seventh aspect of the present invention, an exhaust nozzle for a jet engine has a cruising mode and a noise reducing mode. An exhaust nozzle for a jet engine is provided with a noise reducing apparatus according to the fifth aspect so as to reduce noise due to the exhaust gas from an engine in a noise reducing mode.

In this exhaust nozzle for a jet engine, noise is reduced effectively. Also, a light-weight apparatus can be easily realized by a mixer which is built in an apparatus.

According to an eighth aspect of the present invention, in an exhaust nozzle for a jet engine, a flow channel for accelerating an exhaust gas from an engine is formed behind a noise reducing apparatus in a cruising mode, and a flow channel of which a cross section is constant is formed behind the noise reducing apparatus in the noise reducing mode. By doing this, propulsion force occurs by a flow which is accelerated behind a noise reducing apparatus in a cruise mode, and propulsion force occurs by a flow which is accelerated by a noise reducing apparatus in a noise reducing mode.

According to a ninth aspect of the present invention, in an exhaust nozzle for a jet engine, an exhaust nozzle according to the sixth aspect has diaphragm/diffusing structure. By doing this, appropriate propulsion force is easily obtained.

As explained above, according to the present invention, the following effects are obtained.

By a noise reducing apparatus for a jet engine according to first through fifth aspects, and by an exhaust nozzle for a jet engine according to sixth through ninth aspects, a structure for retracting a mixer is not necessary, it is possible to reduce noise effectively, and a light-weight apparatus is realized easily by using an efficient mixer.

Also, by an exhaust nozzle for a jet engine according to claims sixth to ninth aspects, by varying a cross section area of diffusing flow channel according to cruising speed, there is less loss in a gas flow; thus, optimal propulsion efficiency can be obtained.

DETAILED DESCRIPTION OF THE INVENTION

Here, an embodiment of an exhaust nozzle for a jet engine having a noise reducing apparatus according to the present invention is explained with reference to drawings as follows.

Figure 2:
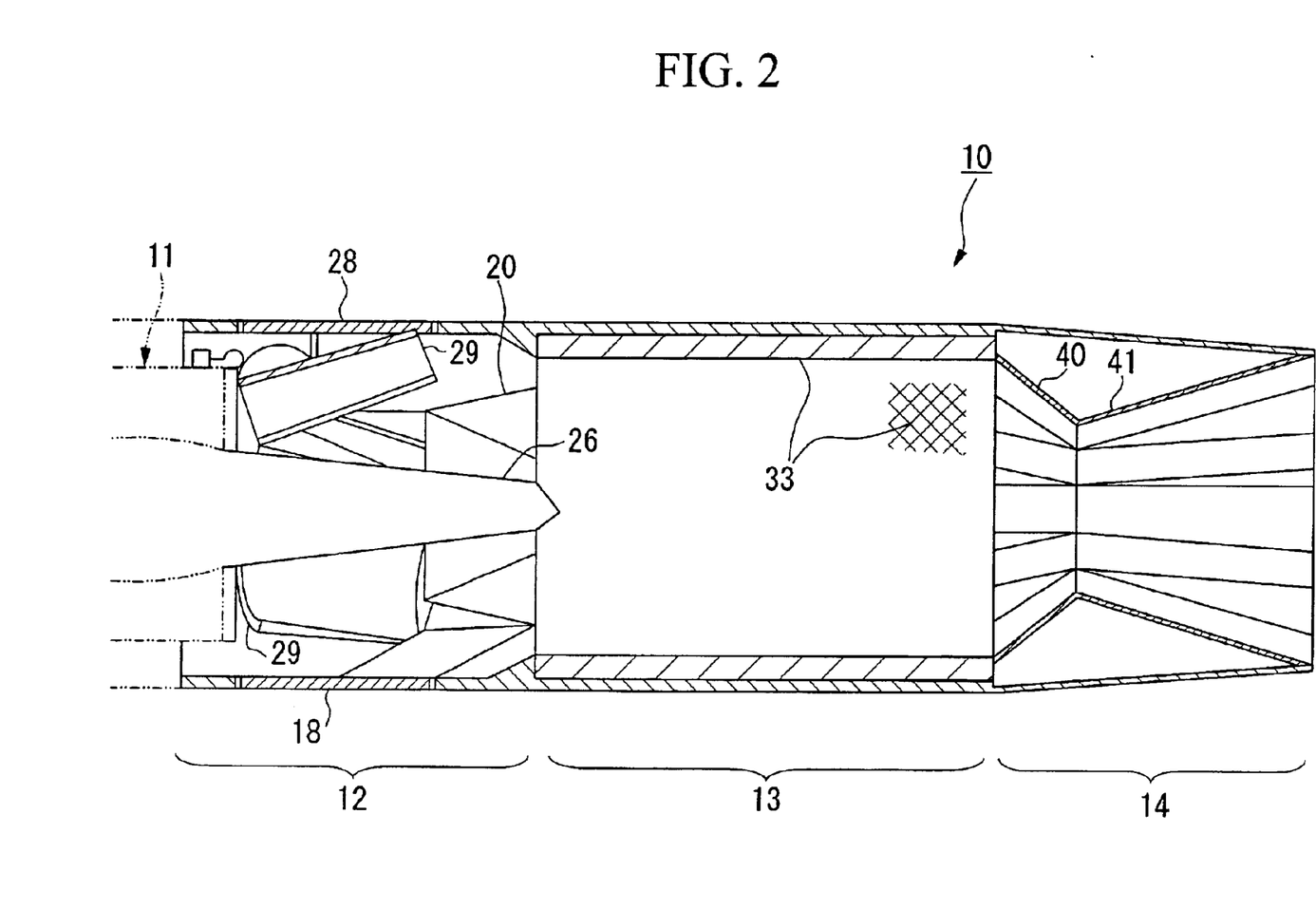
FIG. 2 is a cross section showing an exhaust nozzle for a jet engine according to the present invention.

FIG. 2 is a cross section of an exhaust nozzle for a jet engine according to the present invention.

An exhaust nozzle according to the present invention is used for a jet engine for a supersonic transporter, and has a cruise mode for cruising and a noise reducing mode for taking-off, landing, and low level flight. Furthermore, a cruising mode has a sub-supersonic cruising mode for cruising at a sub-supersonic speed and a supersonic cruising mode for cruising at a supersonic speed. Also, these modes can be switched. selectably by a controlling device (which is not shown in drawings).

Figure 3:
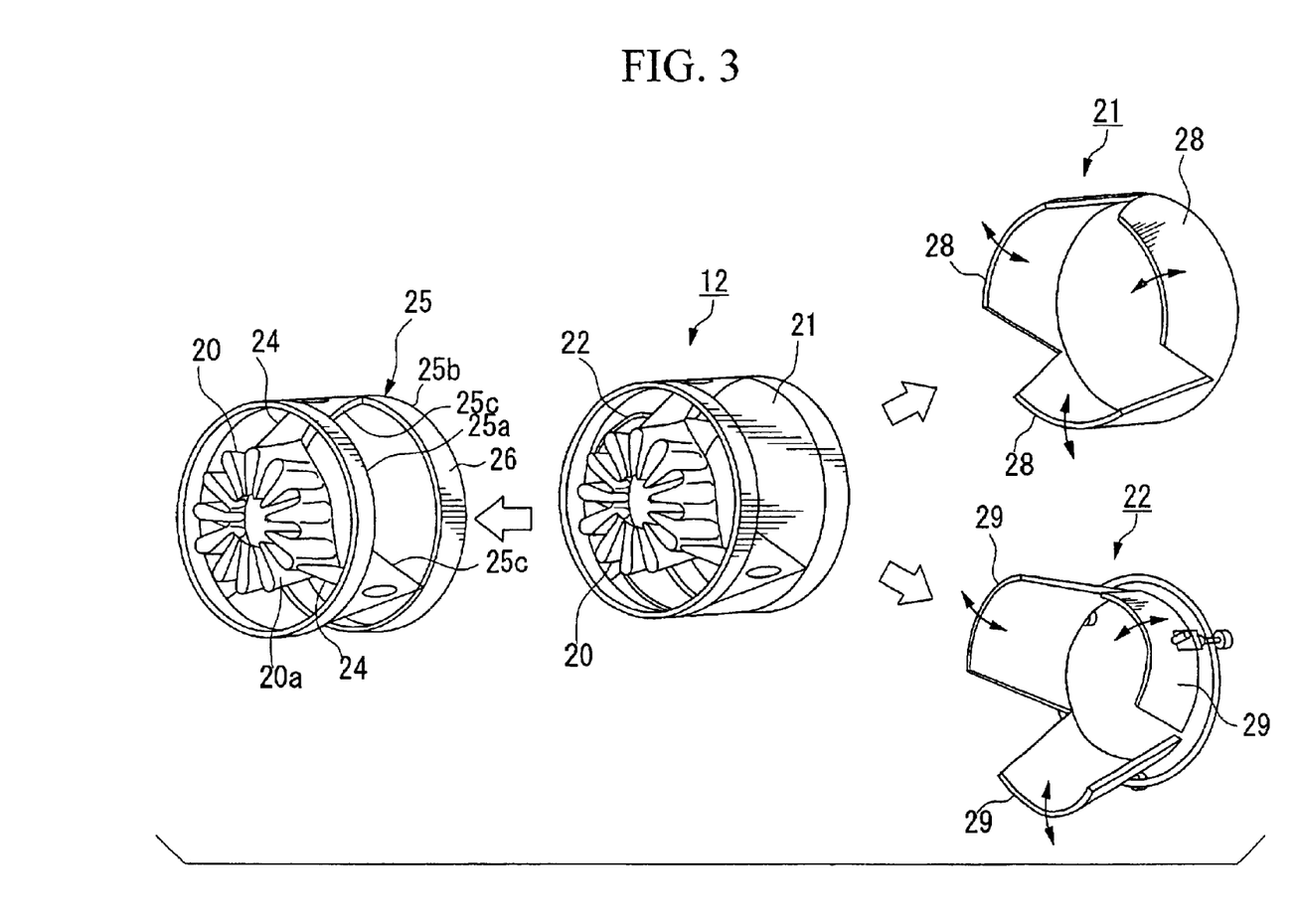
FIG. 3 shows a disassembling steps of an intake section shown in FIG. 2.

In FIG. 2, an exhaust nozzle 10 has an overall structure including a circular cross section. Also, an intake section 12 as a flow channel forming section, a sound absorbing duct 13, and a convergent-divergent section 14 are disposed behind an engine 11 by an order of an intake section 12, a sound absorbing duct 13, and a diaphragm/diffusing section 14 in a direction from an engine to a backward direction. An intake section 12 has a mixer 20 thereinside for mixing an exhaust gas from an engine 11 and an external air so as to form a flow channel (intake) for introducing an external air into a mixer 20 in a noise reducing mode. That is, an intake section 12, as shown in FIG. 3, includes a mixer 20, a first introducing member 21 for forming a flow channel for introducing a fluid, a second introducing member 22, and a plurality of first actuator 23 for driving a first and second introducing members.

A mixer 20 is a fixed type lobe mixer having an entirely circular shape. A mixer 20 has a penetration structure in which partition walls 20a are joined with each other in a radial direction at one end in a downstream so as to mix a fluid which flows inside of a partition wall 20a and a fluid which flows thereoutside efficiently. A shape of a mixer 20 is designed such that a cross section area of a flow channel which is inside of a partition wall 20a becomes minimum at a downstream end, and a resistance which is applied to a fluid which flows in an axial direction becomes as small as possible (for example, a cross section area of the entire projected profile of a mixer 20 is made lower than 20%).

Also, a mixer 20 is fixed to a frame 25 by a plurality of struts 24 such that a central axis coincides with an axial center of an engine. Also, a plug 26 is put into a central circular opening section so as to introduce an exhaust gas from an engine as shown in FIG. 2. A frame 25 in an intake section 12 as shown in FIG. 3 comprises a first and a second circular members 25a and 25b which are disposed apart from each other on a same axial alignment, and a plurality of support member 25c which connect a first and a second circular members 25a and 25b. These members form a part of a duct 27 (nacelle) contacting an external air.

Figure 4:
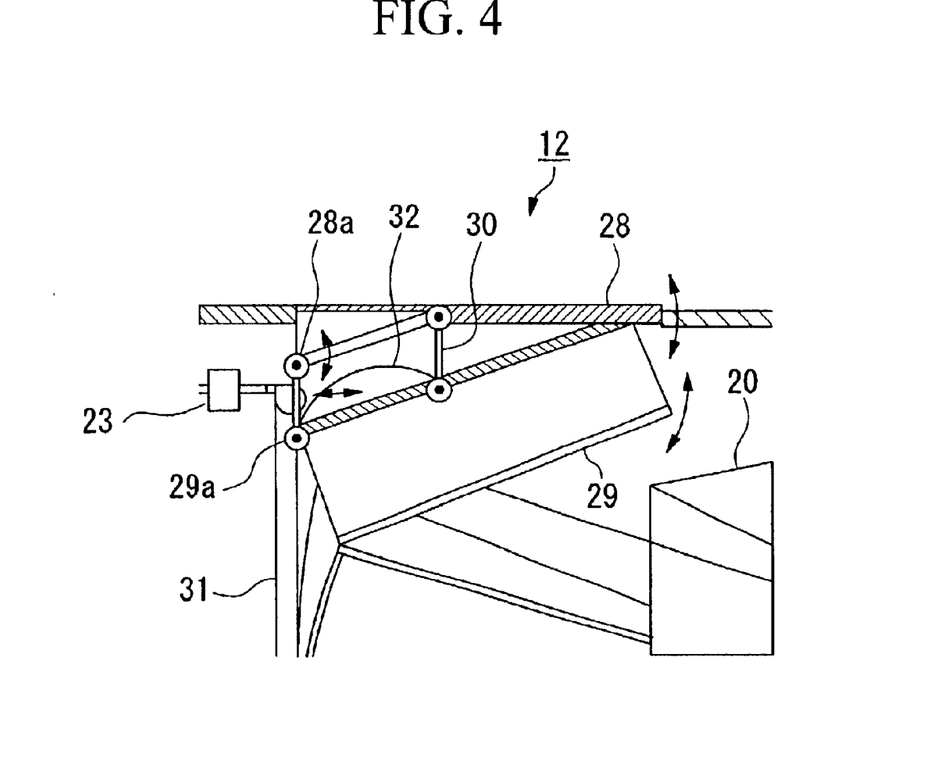
FIG. 4 is an enlarged cross section of an intake section shown in FIG. 2.
Figure 5A:
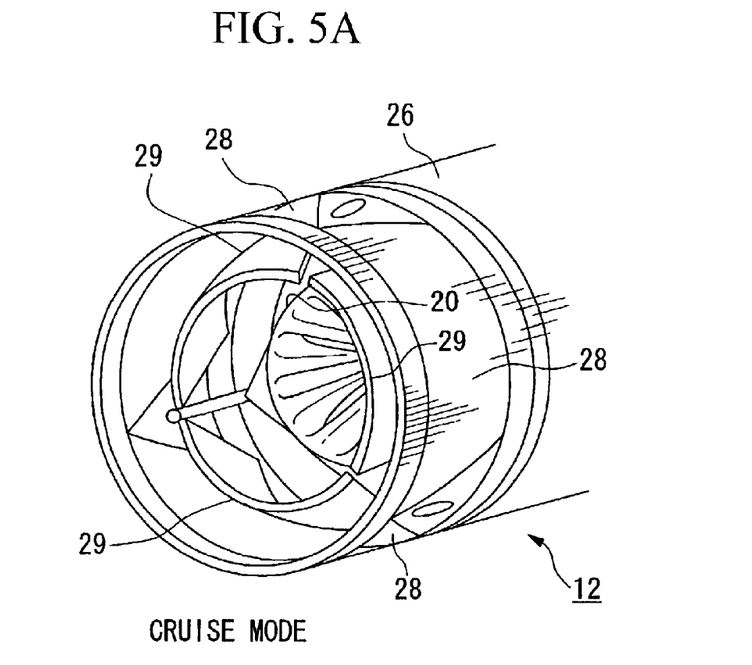
FIGS. 5A and 5B are perspective views of an intake section shown in FIG. 2.
Figure 5B:
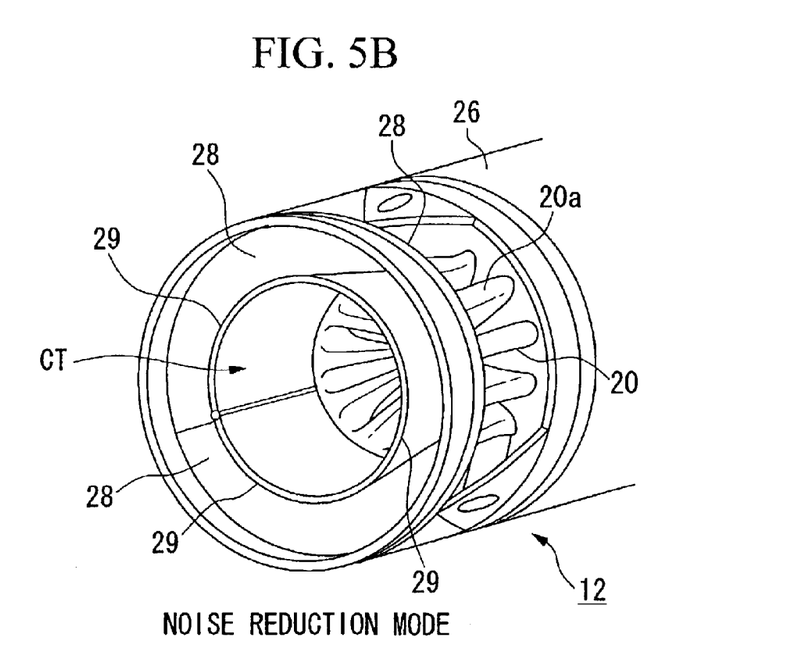

A first introducing member 21 functions as a part of a duct (nacelle) facing to an external air in a cruising mode, and also functions as an ejector intake ramp for introducing an external air in a noise reducing mode. A first introducing member 21 is provided with a plurality (in this embodiment, 3 pieces) of first movable member 28 which are disposed in a circular direction. First movable members 28 are disposed so as to vary disposing condition of first movable members 28 with an end section 28a as a hinge point in an upstream as shown in FIG. 4. Also first movable members 28 is a part of a duct 27 (nacelle) facing to an external air in a cruise mode as shown in FIGS. 5A and 5B and introduces an external air to an outside of a partition wall 20a in a mixer 20 diagonally from a duct 27 in a noise reducing mode.

A second introducing member 22 functions as an diaphragm (convergent) for accelerating an exhaust gas flow from an engine 11 (See FIG. 2) in a noise reducing mode. A second introducing member 22 is provided with a plurality (in this embodiment, 3 pieces) of second movable member 29 which are disposed in a circular direction as shown in FIG. 3 inside a first movable member 28. A second movable member 29 is disposed so as to vary a disposition condition of a second movable member 29 with an end section 29a as a hinge upstream as shown in FIG. 4. Also, as shown in FIGS. 5A and 5B, a second movable member 29 is disposed such that a marginal sections in a circular direction are apart from each other in a cruise mode and each marginal section contacts in a noise reducing mode so as to form a convergent flow channel CT (convergent) thereinside such as a flow channel in which cross section of a flow channel shrinks from an upstream (from an engine 11) toward a downstream (to a mixer 20) and introduces an external air to an inside of a partition wall 20a of a mixer 20 (an external air is absorbed by an ejector effect). Here, a first movable member 28 and a second movable member 29 are connected each other so as to vary a disposition condition cooperatively by a link member 30 as shown in FIG. 4.

Also, a plurality of first actuators 23 are connected via a synchronizing ring 31 so as to operate cooperatively. A plurality of first actuator 23 rotate a first movable member 21 and a second movable member 22 around a hinge point by moving a synchronous ring 31 in an axial direction along a track rail 32 which is disposed on an outer surface of a second movable member 29. Also, a plurality of first actuator 23 are controlled simultaneously in one system by a controller which is not shown in drawings. Here, first actuators are not limited to a structure disclosed in the present embodiment. First actuators can be applied to other structure and driving methods as long as a first introducing member 21 and a second introducing member 22 can be driven.

In FIG. 2, a noise absorbing duct 13 is formed cylindrical entirely. An end section of a noise absorbing duct 13 in an upstream is connected to an intake section 12. An end section of a nose absorbing duct 13 in a downstream is connected to a convergent/divergent section 14. Length (length in an axial direction) of a nose absorbing duct 13 is determined so as to mix a flow of a fluid from a mixer efficiently. Furthermore, a noise absorbing member (absorbing liner) 33 is attached on an inner surface of a noise absorbing duct 13 so as to absorb a noise of fluid when mixing an exhaust gas and an external air.

A noise absorbing member 33 is made from a porous member having a wide band sound absorbing property. A noise absorbing member 33 is exposed to an exhaust gas from an engine 11; therefore, a member having a high heat resistance such as ceramic is used for a noise absorbing member 33. If it is difficult to form a noise absorbing member 33 cylindrically, it is acceptable to form a heat resistive member in a predetermined shape of a plate (for example, a polygonal shape) and lay such plates on an inner wall of a noise absorbing duct 13. Also, in order to prevent an exhaust gas from entering a noise absorbing member 33 and avoid increase of resistance, it is acceptable that a noise absorbing member 33 be disposed near an inner wall of a noise absorbing duct 13 having a space therebetween, a bleeding line for supplying an air to a space is disposed, pressure inside a space is maintained higher than pressure of an exhaust gas which flows into a noise reducing duct 13, a bleeding air is flown inside via a porous noise absorbing member 33.

A noise reducing apparatus is structured as a part of an exhaust nozzle by an intake section 12 as a flow channel forming section and a noise absorbing duct 13.

Figure 6:
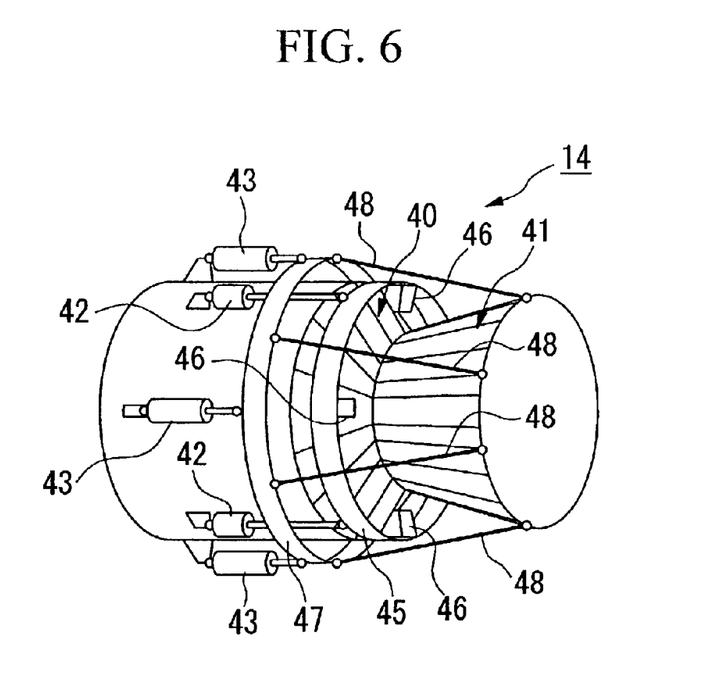
FIG. 6 is a perspective view showing an overall structure of a diaphragm/diffusing section shown in FIG. 2.

A convergent/divergent section 14 forms a convergent-divergent flow channel for accelerating an exhaust gas from an engine 11. As shown in FIG. 6, a convergent/divergent section 14 comprises a C flap 40 which functions as a convergent flap in a cruise mode, a D flap 41 which functions as a divergent flap in a cruise mode, a second actuator 42 and a third actuator 43 for varying a disposition condition of a C flap 40 and a D flap 41.

Figure 7:
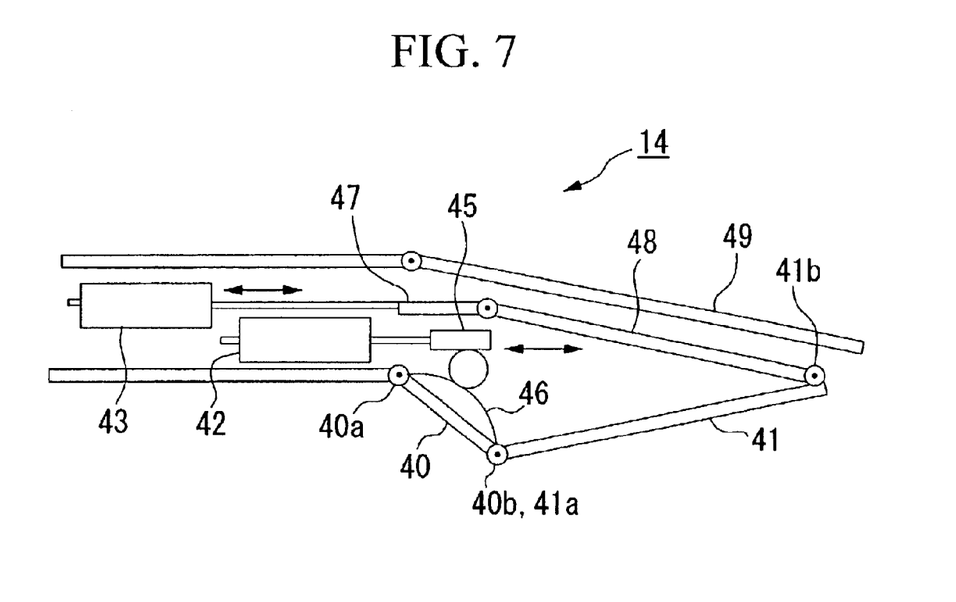
FIG. 7 is an enlarged cross section showing a part of a diaphragm/diffusing section shown in FIG. 2.

A plurality of C flaps 40 are disposed in a circular direction neighboring each other. As shown in FIG. 7, a plurality of C flaps 40 are driven by a second actuator 42, a cross sectional area (area of an opening section formed by an end section 40b downstream) of convergent flow channel is varied at an end section 40a as a hinge point in an upstream (left-hand side in FIG. 7). Also, a plurality of D flap 41 are disposed in a circular direction neighboring each other similarly to C flaps 40. An end section 41a of D flap 41 is connected to an end section 40b of a C flaps 40 and driven by a third actuator 43. A cross sectional area (area of an opening section formed by an end section 41b in downstream) of divergent flow channel is varied at an end section 41a as a hinge point.

Also, a plurality of second actuators 42 are connected via a synchronous ring 45 for C flaps so as to work synchronously. A C flap 40 rotates around a hinge point by moving a synchronous ring 45 for a C flap in an axial direction along a track rail 46 which is disposed on an outer surface of a C flap 40. Furthermore, a plurality of third actuator 43 are connected via a synchronous ring 47 for a D flap so as to work synchronously. A D flap 41 rotates around a hinge point via a link member 48 for a D flap which connects a synchronous ring 47 for a D flap and an end section 41b of a D flap 41 by moving a synchronous ring 47 for a D flap in an axial direction. Here, a reference numeral 49 indicates an E flap which functions as an external flap. An E flap 49 is disposed so as to cover a C flap 40 and a D flap 41 from thereoutside. An E flap 49 is disposed so as to be always nearly parallel with a link member 48 for D flap.

Here, an operation of a convergent/divergent section 14 is explained.

Figure 8A:
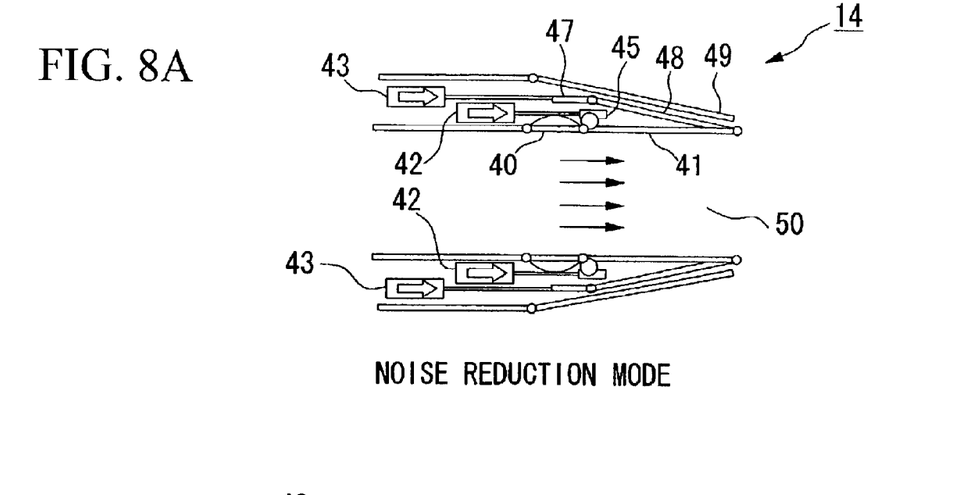
FIGS. 8A to 8C are views showing various modes of a diaphragm/diffusing section shown in FIG. 2.
Figure 8B:
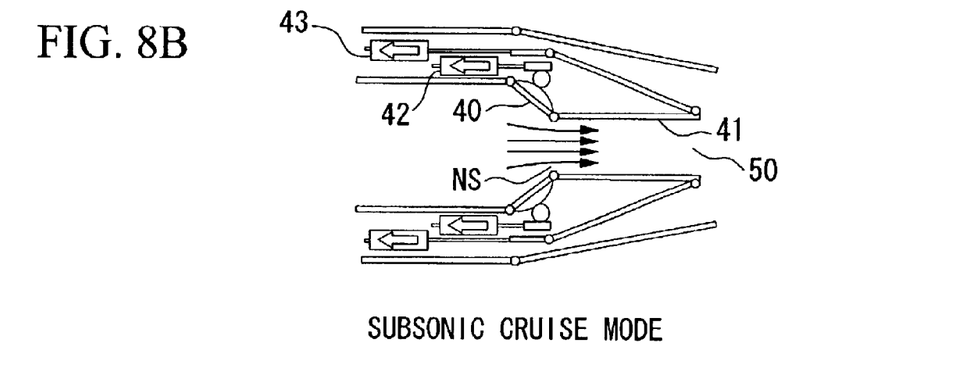
Figure 8C:
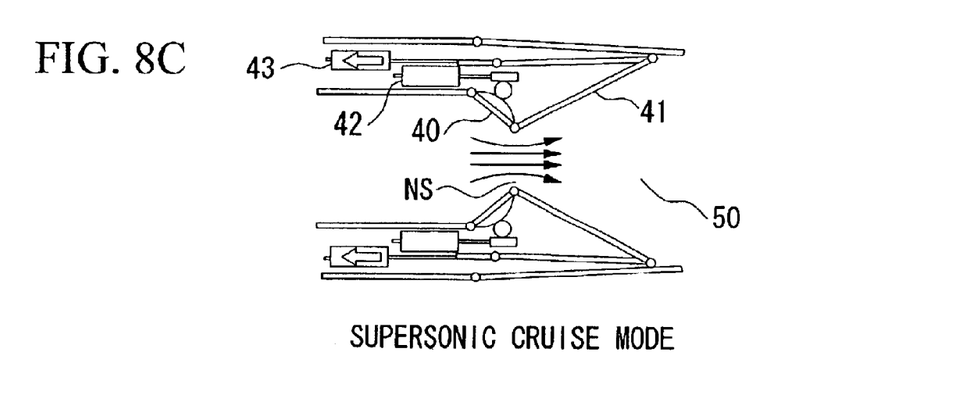

FIGS. 8A to 8C explains a disposition condition of a convergent/divergent section 14 according to various modes. FIG. 8A is a noise reducing mode (taking-off, landing, and low level flight). FIG. 8b is a supersonic cruise mode. FIG. 8C is a sub-supersonic cruise mode.

In a convergent/divergent section 14 in a noise reducing mode, a synchronous ring 45 for a C flap and a synchronous ring 47 for a D flap are moved to a downstream (in a right-hand direction in FIGS. 8A to 8C) by a second actuator 42 and a third actuator 43, a C flap 40 and a D flap 41 are disposed on the same circumference; thus, a flow channel having a constant cross sectional area in an axial direction is formed. Therefore, a gas flow from an upstream is exhausted from an exit 50 without large pressure variance.

In a sub-supersonic cruise mode, a synchronous ring 45 for a C flap and a synchronous ring 47 for a D flap are moved to an upstream (to a left-hand direction) comparing to a noise reducing mode by a second actuator 42 and a third actuator 43; thus, an end section in a downstream to a C flap 40 moves in an axial center direction. By doing this, a convergent flow channel (convergent section) of which cross sectional area shrinks in a gas flow direction is formed. Also, a divergent flow channel (divergent section) of which cross sectional area is enlarged in a gas flow direction is formed behind a convergent section. A gas flow is accelerated by a convergent section (transonic flow). Here, a nozzle throat NS (a region of which cross sectional area is the narrowest) is located at an end section of a downstream to a C flap 40. Speed of a gas flow which flows out of a nozzle throat NS is increased at a convergent section and is exhausted from an exit 50.

In an supersonic cruise mode, a synchronous ring 47 for a D flap moves to an upper position than a sub-supersonic cruise mode by a third actuator 43. By doing this, comparing to a sum-supersonic cruise mode, a cross sectional area of a convergent section is constant, a cross sectional area of a divergent section is enlarged in a gas flow direction, an opening area in an exit 50 is large. A gas flow is accelerated by a convergent section so as to be a supersonic flow. Such a supersonic flow is diffused by a divergent section. In a supersonic cruise mode, pressure ratio between pressure in a convergent/divergent section 14 and pressure of an external air is higher than a case of a sub-supersonic cruise mode. Therefore, if a cross sectional area of a divergent section is equal to a sub-supersonic cruise mode, there is a concern that a gas flow cannot be exhausted efficiently due to a resistance because of a pressure difference to an external air and an appropriate propulsion force cannot be obtained. Here, a gas flow in a convergent section can be accelerated more efficiently so as to exhaust a supersonic jet flow from an exit 50 than a sub-supersonic cruise mode by enlarging a cross sectional area of a divergent section. By doing this, a cross sectional area of a convergent section varies by a third actuator 43 according to cruising speed in this convergent/divergent section 14; thus, an exhaust gas is diffused efficiently in a divergent section. Therefore, a gas flow is accelerated in a convergent section efficiently, an appropriate propulsion force can be obtained efficiently. Also, in order to move a flap by using a second actuator, a third actuator, and a link structure, it is necessary that a disposition of a flap be flexible and a propulsion force be obtained efficiently. For that purpose, in the present invention, it is possible to transform a flow channel.

Figure 1:
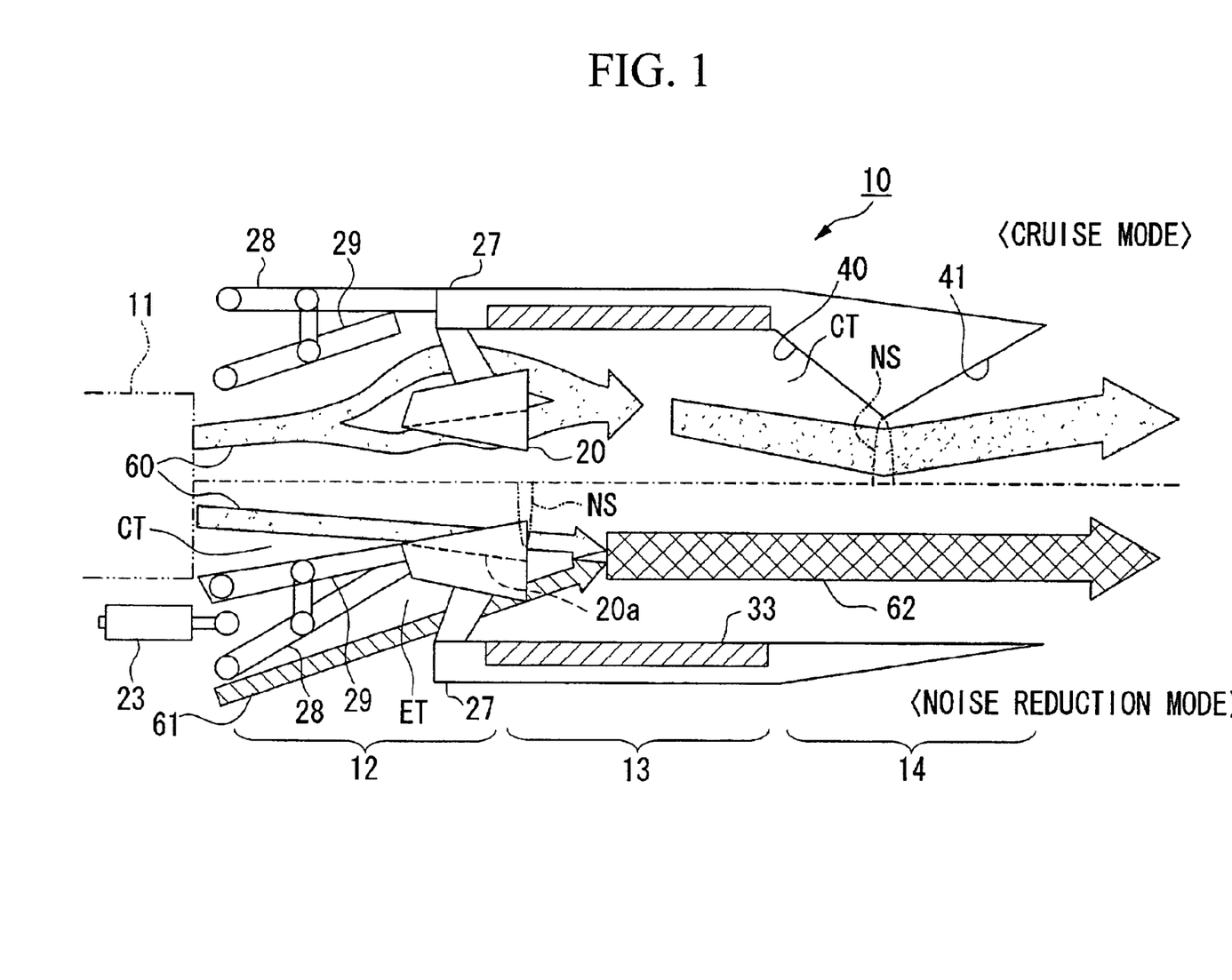
FIG. 1 is a cross section showing an overall jet flow in an exhaust nozzle for a jet engine according to the present invention. The upper half of the cross section shows a cruising mode. Thr lower half of the cross section shows a noise reducing mode.

Next, a noise reducing operation in an exhaust nozzle for a jet engine which has the above-mentioned structure is explained. FIG. 1 is a view showing a flow of an exhaust gas 50 from an engine 11 in an exhaust nozzle 10. An upper half of FIG. 1 shows a cruise mode, and a lower half of FIG. 1 shows a noise reducing mode.

First, in a cruise mode, a first movable member 28 of an intake section 12 is a part of a duct 27 (nacelle) which faces to an external air, and a second movable member 29 is opened. At this time, a resistance by a first movable member 28 and a second movable member 29 against a flow of an exhaust gas 60 is small because a first movable member 28 and a second movable member 29 are disposed in offset positions from a flow channel of an exhaust gas 60.

A high speed exhaust gas 60 which is exhausted from an engine 11 is accelerated by a convergent/divergent section 14 as above mentioned. A propulsion force is generated by this accelerated jet flow. In this time, a mixer 20 is disposed having a predetermined distance from a nozzle throat NS ahead (in an upstream) of a nozzle throat NS; thus, an exhaust gas 60 flows at a low speed (for example, Mach 0.3) before it is accelerated in an intake section 12 having a mixer 20; therefore, there is only a little influence on propulsion efficiency by a resistance of a mixer 20. There is no noise reducing operation in a cruise mode, because it is assumed that an aircraft is cruising high altitude where noise is not a problem.

In a noise reducing mode, a first movable member 28 of an intake section 12 is moved in an axial center direction by a first actuator 23, and marginal sections contact each other. By doing this, a convergent flow channel (convergent section CT) of which cross sectional area shrinks in a direction from an engine 11 toward a mixer 20 is formed. In this time, a nozzle throat NS is disposed in an end section in a downstream to a mixer 20 and formed in an inside surrounded by a partition wall 20a. A high speed exhaust gas 60 which is exhausted from an engine 11 is introduced to an inside of a partition wall 20a of a mixer 20 while being accelerated by a convergent section CT which is formed in an intake section 12. A high speed exhaust gas 60 is furthermore accelerated by a mixer 20 so as to be a jet flow. In this time, as above mentioned, a flow channel having a constant cross sectional area in an axial direction is formed in a convergent/divergent section 14; thus, a big pressure change does not occur partially. By doing this, it is possible that an exhaust gas 60 is accelerated securely by a convergent section CT in an intake section 12.

Also, by disposing a second movable member 29 diagonally from a duct 27, an ejector intake ET is formed as a flow channel for introducing an external air. Consequently, an external air 61 which is introduced to an exhaust nozzle 10 is introduced to an outside of a partition wall 20a of a mixer 20 along an outer circumference surface of a second movable member 29 as an ejector intake ramp so as to be mixed into an exhaust gas 60.

At this time, an exhaust gas 60 and an external air 61 are mixed efficiently by a lobe mixer 20, and speed of a mixed jet flow 62 is reduced; thus, noise is reduced. Furthermore, when a jet flow 62 flows in a noise absorbing duct 13, noise of jet flow 62 is absorbed by a noise absorbing member 33; thus, noise is further reduced.

That is, an exhaust nozzle 10 for a jet engine according to the present embodiment has not only a function for reducing noise by an intake section 12 but also a function for generating a propulsion force by accelerating an exhaust gas 60. By doing this, it is possible to dispose a mixer 20 distantly ahead to a convergent/divergent section 14 for accelerating an exhaust gas 60 in a cruise mode. Therefore, even if a mixer 20 is fixed on a flow channel of an exhaust gas 60, speed of an exhaust gas 60 flowing in a mixer 20 is low before accelerated in a cruise mode. Therefore, an influence by a mixer 20 is not occur so bad. Therefore, a structure for retracting a mixer 20 is not necessary comparing to a conventional apparatus; thus, it is possible to realize a light-weight apparatus.

Furthermore, it is possible to reduce noise securely by adapting a mixer having high mixing efficiency because a fixed-type mixer can be used. Also, because it is not necessary to separate a mixer, it is possible to assemble a large light-weight mixer easily.

Furthermore, it is possible to realize a more rigid and lighter-weight apparatus easily than an exhaust nozzle having a rectangular cross section because an entire cross section of an exhaust nozzle 10 including an intake section 12 can be formed in a circular shape. Also, if the cross section is circular, it is possible to connect a plurality of actuators by the above-mentioned synchronous ring 31 or the like. Therefore, it is possible to operate a plurality of actuators cooperatively by a simple structure. Furthermore, similar to an above-mentioned first movable member 28 and a second movable member 29 for example, by structuring an apparatus such that movable members are operated cooperatively by a link member, it is possible to control by one system of actuators. Thus, it is possible to reduce actuators so as to simplify a structure of the apparatus.

Here, factors such as structure and a shape of each member as shown in the above embodiments are only examples. Such factors may be changed according to designing point of view or the like as long as such a change is within a range of purposes and effects of the present invention. The present invention may include changes as follows.

The present invention may be applied to not only a supersonic transporter but also to other aircraft having a jet engine in which noise must be reduced.

Also, although a lobe mixer is used for a mixer for mixing an external air and an exhaust gas in the above-mentioned embodiment, the present invention is not limited to such a case. The present invention may use other types of mixer.

Also, an above-mentioned embodiment is provided with an intake section 12 as a flow channel forming section, a noise absorbing duct 13, and a convergent/divergent section 14. However, it is possible to reduce noise while realizing a light-weight apparatus as long as an intake section 12 and a convergent/divergent section 14 are provided thereto. Furthermore, in order to accelerate an exhaust gas in a cruise mode, it is acceptable that at least a convergent flow channel be provided. Therefore, a structure which does not have a divergent flow channel is acceptable.

Also, it is possible to further realize a light-weight apparatus by using light-weight member such as ceramic composite member or an Al system metal compound.

Also, as disclosed in Japanese Unexamined patent application, first Publication No. Hei. 07-247905, a noise absorbing duct 13 may comprise a plate member which has a plurality of noise absorption holes, a honeycomb structure which supports a plate member and has a plurality of independent noise absorbing chambers, and a reflection plate which supports a honeycomb structure and has a plurality of through holes for introducing air. Such a noise absorbing duct 13 may be structured such that low temperature air is supplied to inside of a noise absorbing duct 13 via air introducing holes, noise absorbing chambers, and noise absorbing holes so as to drop the temperature in a noise absorbing duct 13 and temperature of a absorbing member 33 itself.

What is claimed is:

1. A noise reducing apparatus for a jet engine comprising:
   a mixer to mix exhaust gas from the engine and external air;
   a flowing channel forming section, which forms a flow channel that accelerates the exhaust toward the mixer in a noise reducing mode and a flow channel that introduces external air to the mixer, wherein noise due to exhaust gas from the engine is reduced in the noise reducing mode, and wherein the flow channels have a circular cross-section and wherein a flow channel comprises:
      a first movable member which is part of a duct facing external air in a cruising mode and which guides the external air diagonally from the duct to the mixer in the noise reducing mode;
      a plurality of second moveable members which are disposed apart from each other in a cruising mode and contact each other in the noise reducing mode and form a diaphragm flow channel thereinside;
      an actuator which changes disposition of the first and second moveable members according to the mode.

2. A noise reducing apparatus for a jet engine according to claim 1, wherein a first movable member and the second movable members are connected so as to make cooperative movement.

3. A noise reducing apparatus for a jet engine according to claim 2, wherein a noise absorbing duct is disposed where an absorbing member is attached thereinside behind a mixer.

4. An exhaust nozzle for a jet engine having cruising mode and noise reducing mode and is provided with a noise reducing apparatus according to claim 3 so as to reduce noise due to the exhaust gas from an engine in noise reducing mode.

5. An exhaust nozzle for a jet engine according to claim 4, wherein a flow channel for accelerating an exhaust gas from an engine is formed behind a noise reducing apparatus in cruising mode, and a flow channel of which cross section is constant is formed behind the noise reducing apparatus in the noise reducing mode.

6. An exhaust nozzle for a jet engine according to claim 5 wherein the exhaust nozzle has a diaphragm/diffusing structure.

* * * * *